United States Patent

[11] 3,588,656

| [72] | Inventor | Fred M. Shofner<br>Tullahoma, Tenn. |
|---|---|---|
| [21] | Appl. No. | 750,844 |
| [22] | Filed | Aug. 7, 1968 |
| [45] | Patented | June 28, 1971 |
| [73] | Assignee | The University of Tennesse Research Corporation<br>Knoxville, Tenn. |

[54] PROGRAMMABLE ELECTROMECHANICAL OSCILLATOR
5 Claims, 4 Drawing Figs.

| [52] | U.S. Cl. ................................................ | 318/282, |
|---|---|---|
| | | 318/127, 318/293, 318/313 |
| [51] | Int. Cl. .................................................. | H02p 1/00 |
| [50] | Field of Search ...................................... | 318/127, |
| | 129, 132, 293, 313, 227, 282, 286 | |

[56] References Cited
UNITED STATES PATENTS

| 3,328,662 | 6/1967 | Gambili ........................ | 318/313 |
| 3,331,239 | 7/1967 | Larson et al. ................. | 318/132 |
| 2,310,084 | 2/1943 | Hooker et al. ................ | 318/300 |
| 3,166,699 | 1/1965 | Dalzell ......................... | 318/282 |
| 3,369,381 | 2/1968 | Crane et al. .................. | 318/281 |

*Primary Examiner*—Oris L. Rader
*Assistant Examiner*—K. L. Crosson
*Attorney*—Cameron, Kerkam and Sutton

ABSTRACT: An electromechanical oscillator is provided for automatically shaking and mixing low-reaction rate chemicals. The programmable oscillator includes a reversible DC drive motor adapted to be energized to supply both oscillatory and rotational motion. Oscillatory and rotational motion are established by selectively gating one of a pair of SCR's to reverse the sense of armature current of the drive motor. Timer and latching relay logic circuits provide desired programming of the oscillator about or at a prescribed angular position.

INVENTOR
FRED M. SHOFNER

Cameron, Kerkam & Sutton
ATTORNEYS

INVENTOR
FRED M. SHOFNER

PROGRAMMABLE ELECTROMECHANICAL OSCILLATOR

BACKGROUND OF THE INVENTION

The invention is readily adapted for use in any environment where it is desired to provide a programmed drive including both oscillatory and continuous rotational motion, as well as intermittent periods of no motion. Such a drive is often required in connection with shakers used for chemical analysis, and the present invention is particularly adapted for providing a programmed drive to shake and mix low reaction rate chemicals deployed in a Counter Current Distribution Rack consisting of interconnected glass tubing arranged in one or more planes. While the invention is described in relation to its application as a drive means for a Counter Current Distribution Rack, it should be noted however, that such a description is made only to facilitate an understanding of the invention and is not intended to limit the scope of the invention which is defined in the appended claims.

Typical operational requirements for a Counter Current Distribution Rack may include three consecutive angular positions within repetitive 360° rotations. One position corresponds to a shaking condition wherein there is provided a prescribed oscillatory motion for a selected period about a preferred reference or zero position. For example, there may be provided a swing of plus or minus 15° at a rate between 20 to 80 cycles per minute and extending for a selected period from several minutes to several hours. After the shaking position, a second position is established for the rack which includes a motionless or stationary period that permits settling, after which continuous rotational motion is provided by the same motor to advance the rack to the third position. This stationary period may be programmed to extend from several minutes to several hours. A third position corresponds to a pour condition in which the oscillatory and rotational drive control circuits are also deenergized for a fixed period, once the position is reached. Advantageously, at each position, the period may be selectively set in accordance with the particular analysis being conducted.

Conceivably, it may be possible to establish an oscillatory drive to meet the above-defined conditions by providing a mechanical reciprocating drive arrangement with associated clutches and motors. Such an arrangement, however, would not be acceptable from the standpoint of maintenance, cost, size, and simplicity. The present invention avoids use of clutches as well as any complicated mechanical hook-up and provides a relatively compact unit which is relatively low in cost and simple in operation.

SUMMARY OF THE INVENTION

The primary object of the present invention is to provide an improved electromechanical oscillator.

Another object of the present invention is to provide an improved electromechanical oscillator adapted to be programmed for oscillation about or at a prescribed angle or reference position.

A further object of the present invention is to provide an electromechanical oscillator adapted to provide both oscillatory and rotational motion with a single DC motor.

These and other objects and their attendant advantages will be readily apparent from the following description of the present invention. In carrying out the present invention in one illustrative form thereof a reversible DC motor is directly coupled to the shaft of a shaker rack. Drive torque for the DC motor may be reversed by reversing the armature current of the motor which is accomplished through selective gating of a pair of SCR switching devices connected in the motor armature circuit so as to allow one or the other half waves of an AC wave to pass through the armature winding of the motor. The preferred angle or reference position about which oscillation occurs is determined by a photoelectric reference circuit including a perforated disc coupled to the shaft of the motor. For continuous rotational motion, the state of the SCR gating circuits is fixed so as to produce a constant set torque.

BRIEF DESCRIPTION OF THE DRAWINGS

While the specification concludes with claims particularly pointing out and distinctly claiming the subject matter of the present invention, it is believed that the invention will be better understood from the following description of the preferred embodiment taken in connection with the accompanying drawing wherein like reference characters represent like characters throughout the several views.

In the Drawings.

DESCRIPTION OF THE PREFERRED EMBODIMENT

Figure 1:
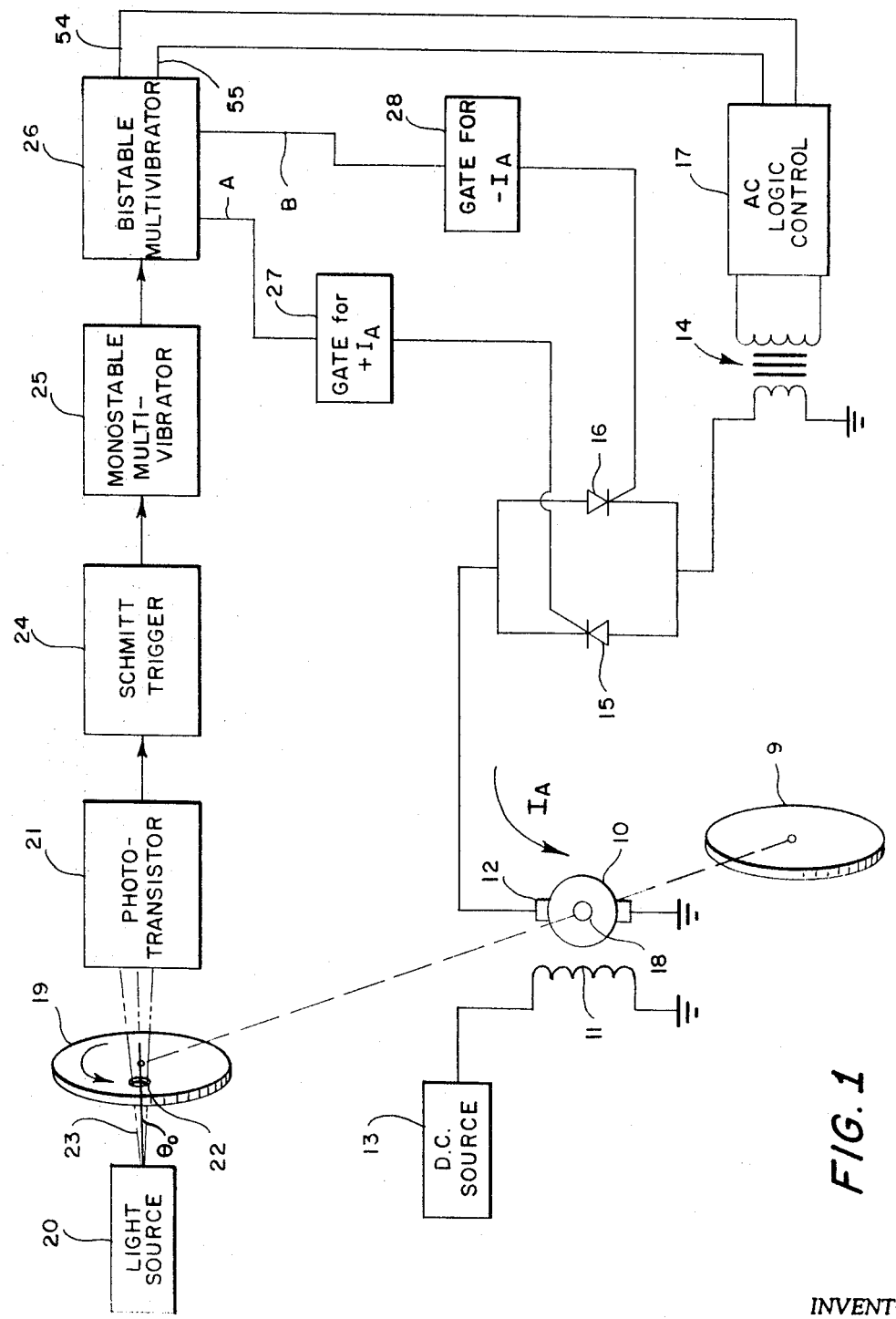
FIG. 1 is a block diagram of the present invention in the shake or oscillatory condition.

An overall picture of the operation of the present invention can be obtained by reference to FIG. 1 which illustrates the manner of applying positive and negative armature current to the DC motor for selective reversal of rotation thereof. Reference character 10 identifies the reversible DC motor having a conventional field excitation winding 11 and armature winding 12. Field winding 11 is connected to a conventional DC excitation source 13 as shown, while the armature winding of motor 10 is electrically connected in series with the secondary winding of power transformer 14. The series connection is established through one of the anode-cathode circuits of a pair of oppositely poled, parallel connected SCR's 15 and 16. The primary winding of power transformer 14 is programmed to be automatically energized from an AC power source through the AC logic control circuit generally designated by block 17.

The output of motor 10 drives a shaker rack which is diagrammatically illustrated by disc 9. Disc 9 may be mechanically coupled or keyed to motor shaft 18 in any conventional manner. Shaft 18 also has mechanically coupled thereto a reference disc 19 which is driven in synchronism with the shaft and which forms part of an optical circuit adapted to establish a zero reference or angular position about which the disc 9 may be oscillated.

The optical circuit includes a conventional light source 20 and light detector 21 which may be, for example, a phototransistor. Disc 19 is provided with a hole 22 and is positioned to rotate between the phototransistor and light source so that a beam of light 23 directed from the light source toward the photocell falls on the photocell when the portion of the disc containing the hole cuts the beam of light. There is thus obtained from the output of the photocell or phototransistor 21 an electrical output pulse for each revolution of the motor shaft.

The output of phototransistor 21 is applied to Schmitt trigger 24 whose output is in turn coupled or electrically connected to trigger monostable multivibrator 25. The output of monostable multivibrator 25 is applied to bistable multivibrator or flip-flop circuit 26, the condition of which is changed by every impulse applied thereto. The states of the bistable multivibrator transistors determine which of gate circuits 27, 28 is fired so as to cause a corresponding gating pulse to be applied through channel A or B to the gate electrode of one of the SCR's 15 or 16.

As should be readily apparent, in a particular state, when one transistor of the bistable multivibrator is OFF the other transistor is ON. The gate pulses are advantageously synchronized with the power transformer output so that the conducting SCR fires once for each cycle of alternating current. The circuit can be adjusted to determine when in the first 90 electrical degrees of an AC wave the SCR's will fire.

Figure 2A:
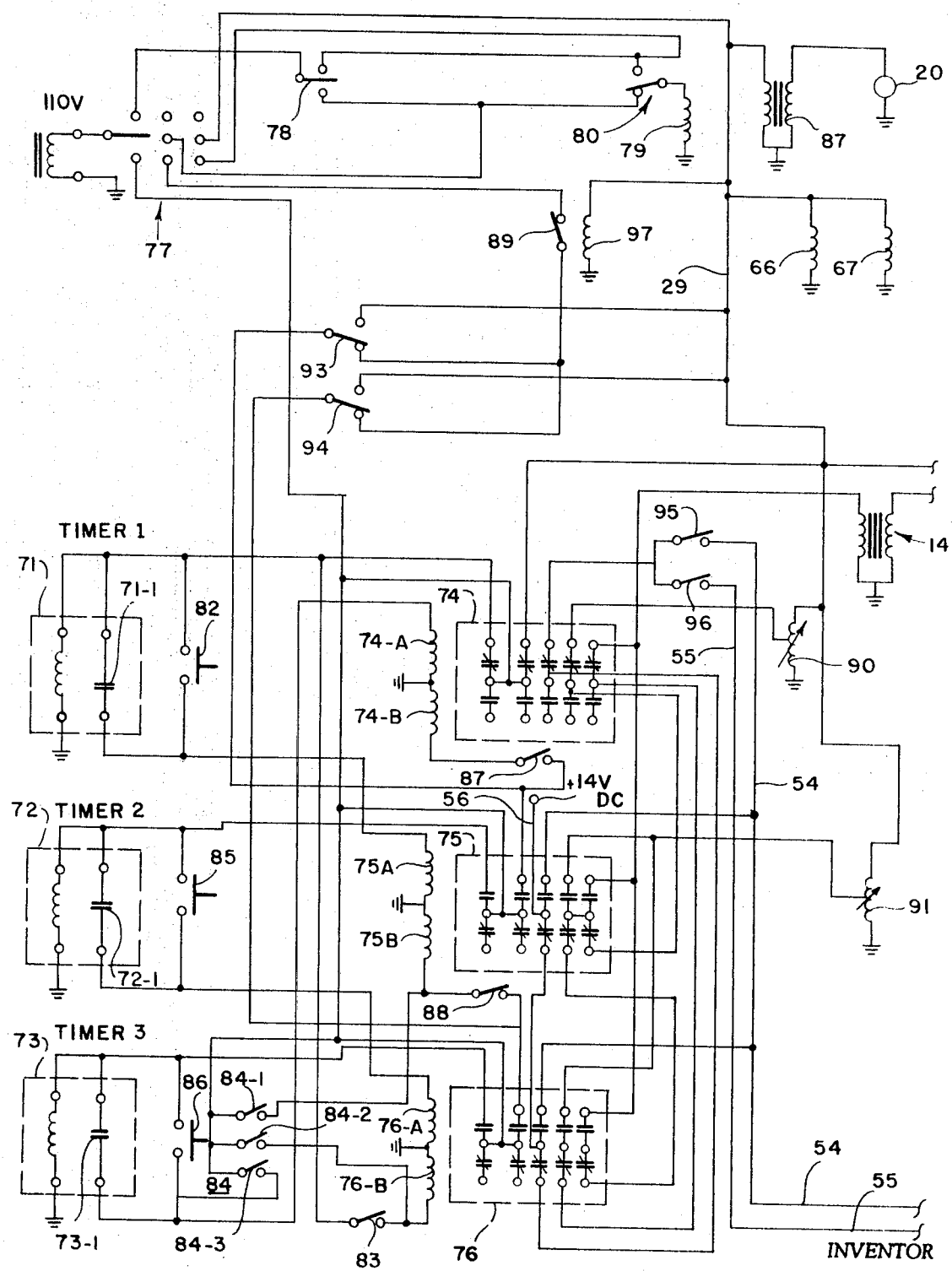
FIG. 2 is a schematic diagram of the electrical circuit of the present invention which for simplicity has been divided into two sections and designated FIG. 2A and FIG. 2B.
Figure 2B:
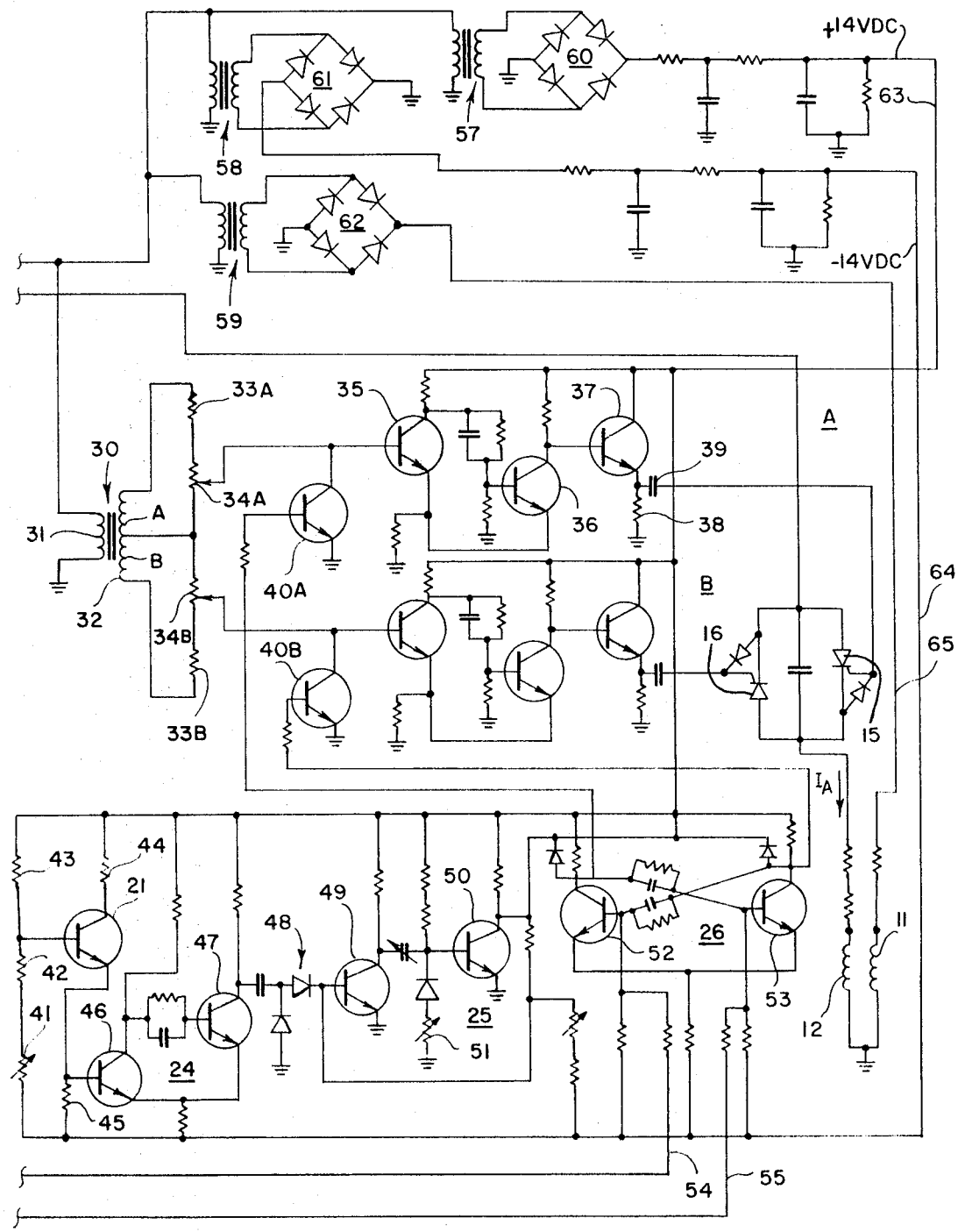

As shown in FIG. 2, the gating circuits 27 and 28 are identical and consist of separate Schmitt triggers which fire off line AC applied to transformer 30. Transformer 30 has its primary winding 31 connected at one end to an AC power bus 29, while the other end of the primary winding is connected to a common ground return. Secondary winding 32 is center tapped to provide separate outputs for channels A and B and is connected across a voltage divider network which provides a firing angle adjust circuit. To this end, each portion of winding 32 has connected there across a resistive leg comprising fixed resistor 33 and a variable resistor 34. (Reference characters A or B are used to designate the channel in which like components are connected.) The output from the variable tap of each resistor 34 determines the firing angle for the Schmitt triggers of the separate channels A and B which in turn control the gating of SCR's 15 and 16, respectively.

Channel A corresponds to the application of a positive armature current and channel B corresponds to the application of a negative armature current. Both channels are identical and reversal of the direction of drive by the DC motor is effected by allowing one or the other half waves of the AC supplied by the power transformer to excite the armature winding. Since both channels are identical, the operation of only one channel will be described.

The AC voltage from the tap of variable resistor 34A is applied to the base of input transistor 35 of gate 27. Gate 27 comprises a pair of transistors 35 and 36 connected in a conventional Schmitt trigger arrangement, a pulse amplifier 37 and a switching transistor 40. The output taken from the collector of transistor 36 is applied to the base of pulse amplifier transistor 37. Resistor 38 and capacitor 39 connected to the emitter of transistor 37 serve to differentiate the output pulse so as to insure the application of sharp pulses to the gate electrode of SCR 15.

Firing of channel A is controlled through switching transistor 40 which returns the base of transistor 35 to ground through its collector-emitter circuit in the energized or ON state. The base of transistor 40A is returned to the collector of the channel A control transistor 53 of the bistable multivibrator 26. Likewise, the base of the corresponding B channel switching transistor 40B is connected to the collector of transistor 52. Thus, the state of bistable multivibrator 26 determines which of the SCR's 15, 16 receives a gating pulse.

The preferred angle or position $\theta$ about which oscillation occurs is determined by the hole 22 selectively positioned in reference disc 19. As disc 19 is rotated, hole 22 periodically cuts the light beam 23 to allow the phototransistor 27 to be illuminated for developing a control signal that establishes the zero reference position corresponding to angle or position $\theta_0$. The amount of illumination required to energize phototransistor 21 may be controlled through resistor 41 which together with resistors 42, 43 and 44 establish the proper biasing voltages for operation of the phototransistor. The output of phototransistor 25 upon illumination is taken across resistor 45 connected in series with the emitter of phototransistor 21 and is applied to Schmitt trigger 24 comprising transistors 46 and 47 and conventional biasing components. Firing of the Schmitt trigger causes a pulse to be applied to the monostable multivibrator 25 through coupling network 48 to initiate the period of monostable multivibrator 25. The period of monostable multivibrator comprising transistors 49 and 50 may be controlled by the setting of variable resistor 51 and the output pulse taken from the collector of transistor 50 is applied to multivibrator 26 to reverse its state.

Assuming initially that transistor 52 is nonconductive and transistor 53 is conductive, the collector of transistor 52 is positive with respect to the collector of transistor 53. A negative input pulse from transistor 50 would tend to cause transistor 52 to start conduction, thereby tending to lower the potential at the collector terminal of transistor 53. Lowering of the potential at this point tends to decrease conduction of transistor 53 which would then tend to cause the potential at the collector of transistor 53 to rise. This change is coupled through the regenerative network of the resistor and capacitor coupled to the base of transistor 52. This tends to drop the potential of the base of transistor 52 causing the transistor to increase in conduction. This, in turn, further lowers the potential at the collector of transistor 52, which lowering of potential is coupled through the resistor and capacitor coupled to the base of transistor 53. As a result of this regenerative action, in a very short time transistor 53 is cut off and transistor 52 is conducting, thereby causing a potential at the collector of transistor 53 to become positive with respect to the potential of the collector of transistor 52 and permitting the circuit to execute the second period of the cycle so that the transistors 52 and 53 are alternately placed in their OFF or ON state.

Upon firing of multivibrator 25 the pulse applied to multivibrator 26 causes the state of the transistors 52, 53 to be reversed or flipped thus reversing the state of channels A and B. This, in turn, causes a change in the sense of armature current and a reversal in direction of rotation of the DC motor 10. A fixed state for multivibrator 26 to provide continuous rotation of the DC motor in either direction may be established through either of conductors 54 or 55 which return the base electrode terminals of transistors 52, 53 respectively, to a fixed positive bus 56.

DC biasing voltages for the circuit may be supplied from a separate external power supply or separate supplies may be corporated in the unit. In the latter case, as shown in FIG. 2, three separate transformers 57, 58, 59 are energized across the AC input lines. Each transformer has its secondary winding connected across a full wave rectifier 60, 61 and 62. Rectifier 60 provides a positive 14 VDC output at lines 63. Rectifier 61 provides a negative 14 VDC output at line 64, and rectifier 62 provides a positive 14 VDC output for excitation of the field winding 11 of motor 10 through line 65.

Power bus 29 also supplies power to a plurality of conventional AC control components including the energizing windings of fan motors 66, 67 which provide cooling for DC motor 10 and SCR's 15 and 16, step down transformer 68 which supplies power to the light source and Variacs 69 and 70 connected in the shake and travel logic circuits.

The basic AC logic control for each position or condition of the shaker is established through a timer and an associated latching relay in combination with the proper actuation of a plurality of limit switches. Thus, for the three positions corresponding to shaking, settling and pouring, three timers 71, 72 and 73 and three latching relays 74, 75 and 76 are provided. Each timer includes an operating winding and a pair of normally open contacts adapted to be closed after the timer times out. The contacts are connected in circuit so that upon closure of the contacts the winding of the latching relay corresponding to the next position is energized.

For convenience, reference will be made to the across-the-line diagram of FIG. 3 to trace the electrical circuit connection. To this end, where a switch or relay contains multiple pairs of contacts, the upper pair of contacts, as viewed in FIG. 2, are designated the "A" contacts and the lower pair of contacts are designated the "B" contacts. Where more than one pair of contacts are provided, each pair going from left to right, as viewed in the drawing, has been consecutively numbered. For example, latching relay 74 comprises two windings 74A and 74B, and five pairs of A contacts 74–1A to 74–5A and five pairs of B contacts 74–1B to 74–5B.

Figure 3:
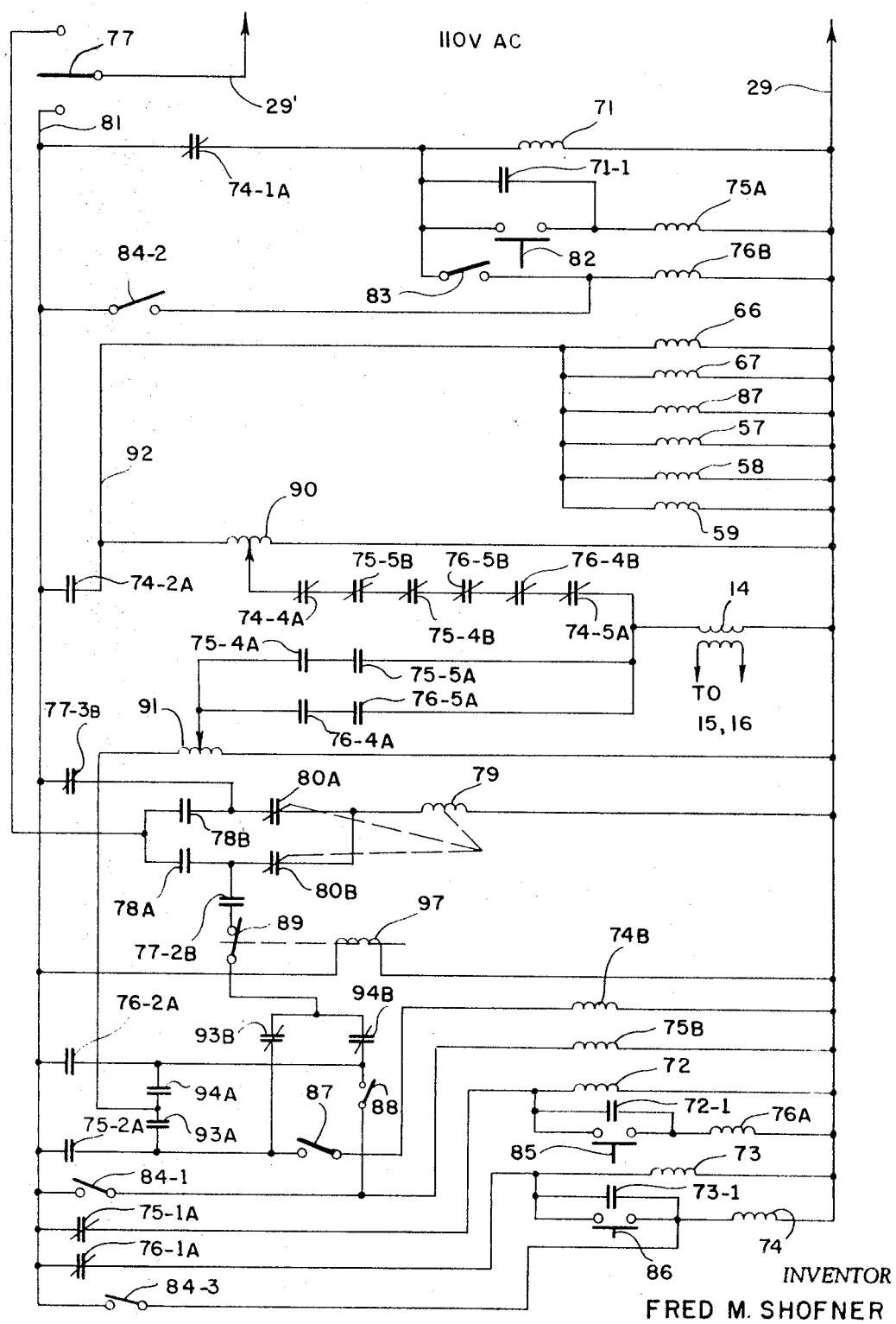
FIG. 3 is an across-the-line diagram of the AC logic circuit of the present invention.

Referring to FIG. 3, AC power is applied across line terminal 29 and 29' through switch 77 which is a three pole double throwswitch. Contacts 77–1A provide for manual operation and upon closure of these contacts, manual brake switch 78 is enabled so that Prony brake motor 79 may be selectively energized. Limit switches 80A and 80B are keyed to the brake cam shaft position and are cam operated by a brake cam (not shown) such that if AC reaches the OFF limit contacts 80A, the motor drives the cam until contacts 80A are open. Similarly, if AC reaches the ON limit contacts 80B the motor drives the cam until contacts 80B open and the Prony brake is set.

The energizing winding of timer 71 is connected across the power conductors 29, 81 through normally closed contacts 74–1A of the latching relay 74. When timer 71 runs out, its contacts 71-1 close and winding 75-A is connected across conductors 29, 81 through normally closed contacts 74-1A. Switch 82 is a manually operable push button switch which provides the same action as timer switch contacts 71-1 and is connected in shunt therewith. Microswitch 83 is connected in series with the windings 76B. Advantageously, microswitch 83 is located so as to be actuated to its closed position automatically upon the motor or disc 9 approaching the zero angle reference position. Windings 76B may also be energized through manually operable contacts 84-2. Switch 84 establishes the appropriate shake conditions about the zero reference angle $\theta_0$ to enable testing as to proper operation of the circuits.

Similar energizing circuits are provided for the energizing windings of timers 72 and 73. Winding 72 is connected across lines 81, 29 through normally closed contacts 75-1A, while winding 73 is connected across the power lines through normally closed contacts 76-1A. Winding 76A is connected in series with timer contacts 72-1 which is in turn shunted by push button switch 85. Winding 74A is connected in series with contacts 73-1 which is in turn shunted by push button switch 86. Winding 74A may also be energized upon actuation of the manually operable, normally open contacts 84-3.

Power to the shake Variac 90 and travel Variac 91 is taken from auxiliary bus 92 connected to conductor 81 through normally closed contacts 74-2A. Energization of auxiliary bus 92 also applies power to the fans 66, 67, primary windings of transformers 57—59 and the primary windings of a light source transformer 87. Power transformer 14 has its primary winding connected in series with the movable tap of either the shake Variac or the travel Variac 91 depending on the condition of the latching relays. As shown, the power transformer is in the shake condition and in energized through serially connected contacts 74-4A, 75-5B, 75-4B, 76-5B, 76-4B and 74-5A. When the travel Variac 91 is energized, power transformer 14 may be excited either through serially connected contacts 75-4A and 75-5A of latching relay 75 or serially connected contacts 76-4A and 76-5A of latching relay 76.

Switches 93 and 94 are position limit switches adapted to define an angular position relative to the zero reference angle about which oscillation takes place. Each switch has a normally closed contact pair adapted to be actuated to an open position when the disc 9 has reached the maximum extent of travel to one side of the zero reference position. The normally closed contacts 93B are connected in series with windings 74B through another microswitch 87. Switch 87 is arranged to be closed just prior to the time that disc 9 reaches one desired maximum angle or position to one side of the zero reference angle.

A similar switch 88 is connected in series with contacts 94B and relay windings 74B and is arranged to be actuated to its closed position just prior to disc 9 reaching the maximum desired angle position to the other side of the reference angle. The junction of contacts 94B and switch 88 is connected to conductor 81 through the actuator contacts 76-2A of relay 76. The junction of contacts 93B and switch 87 may be connected to conductor 81 through the actuator contacts 75-2A of relay 75. The normally open contacts of angle position switches 93 and 94 have a common connection to conductor 92. The other sides of contacts 93A, 94A are connected so as to place the contacts in series with the corresponding microswitch 87 or 88.

Switch 89 prevents continuous rotation of the prony brake cam shaft which would occur if power were applied to the OFF limit switch 80A and the ON limit switch 80B simultaneously through switch contacts 77-2B and 77-3B. Switch 89 is normally closed and open when its operating coil 97 connected across lines 29 and 81 is energized. Thus, the brake 79 cannot be driven to the ON position when the Variac 90 and 91 are excited.

A typical cycle for the AC logic control circuit, assuming that latching relays 75 and 76 are deenergized and timer 71 has just timed out, is as follows: when timer 71 runs out, latching relay 75 is pulled "up" or energized (75-1A through 75-5A are closed and 75-1B through 75-5B are opened). Actuation of relay 75 results in AC being supplied to the contacts 76-2A through switch 93 which is normally closed until the angle corresponding to the position of limit switch 93 is reached. As contacts 76-1A and 76-2A close, the winding of timer 72 is energized.

The motor 10 is driven in one direction as set by the condition forced on bistable multivibrator 26. Just prior to reaching the maximum desired angle of deviation in one direction away from the reference angle corresponding to position limit switch 93, switch 87 momentarily closes and pulls latching relay 74 down. Upon reaching the maximum desired angle of deviation from the reference angle, switch 93 is actuated to its open position and all AC to the controller circuitry is removed and the prony brake 79 is set. All circuits are dormant except timer 72 which is supplied from the mechanically locked latching relay 75. The A contacts of the latching relay 75 allow only the travel Variac 91 to supply excitation to the power transformer connected in series with the SCR's.

The DC which sets the bistable state and the direction of travel of rotation of the motor is supplied through conductor 56 connected to contacts 75-3A. The illustrated DC interconnections prevent the limit microswitches 95 and 96 that operate during the shaking cycle from trying to return the shaker toward the zero reference angle.

When timer 72 has timed out, contacts 72-1 close and latching relay 76 is pulled "up." This releases the brake and allows the motor to be driven toward the maximum desired angle of deviation to the other side of the reference angle which corresponds to position limit switch 94. Just prior to reaching this maximum angle or position, switch 88 momentarily is actuated to pull latching relay 75 down. Upon reaching the angle or position corresponding to limit position switch 94, switch 94 is opened and all components are dormant again except timer 73. The A pairs of contacts of latching relay 74 allow only the travel Variac 91 to be energized. The DC which controls direction of drive of motor 10 is supplied through contacts 75-3A of latching relay 75 until it is pulled down, after which it is supplied through contacts 75-3B and contacts 76-3A of latching relay 76.

When timer 73 has timed out, contacts 73-1 close and latching relay 74 is pulled "up," supplying AC only to the controller. DC is still supplied by latching relay 76 which is still "up." Thus, motor 10 continues to turn only in one direction. Since latching relay 76 is up, only the travel Variac is energized. Prior to the shaking position at the zero reference angle, microswitch 83 is closed momentarily, causing latching relay 76 to be pulled down automatically energizing the shake Variac through the A contacts of latching relay 74. DC is applied through contacts 75-3B, 76-3B and 74-3A through limit switches 95 or 96 to conductors 54 or 55. When timer 71 times out, the cycle is repeated.

Although the invention and its operation have been described with reference to a specific embodiment, it is not intended that the invention be limited to the particular details shown or described which may be varied without departing from the spirit and scope of the invention as defined in the appended claims.

I claim:

1. An electromechanical oscillator comprising a reversible DC motor having a field winding and an armature winding adapted to be excited from a DC and an AC power source, respectively, switching means adapted to be gated for selectively reversing the sense of excitation of the armature winding, means for connecting said switching means in series with the AC excitation source for said armature winding, means for selectively gating said switching means to allow one or the other half waves of the AC excitation source to excite the armature winding of the motor, said switching means comprising a pair of oppositely poled parallel connected semiconductor devices adapted when gated to be switched from a nonconductive to a conductive condition, said means for selectively gating said switching means including a first and a second gating channel, said channels being adapted to be enabled in a fixed state or in a periodic alternating state to provide, respectively, a constant sense or a periodically alternating sense of excitation to said armature winding and said means for selectively gating said switching means further including a photoelectric circuit including an element driven by said motor for establishing a zero reference position about which the motor is driven in an oscillating condition.

2. An electromechanical oscillator as set forth in claim 1 wherein said photoelectric circuit further includes a light source and a photocell, said driven element being a reference disc having an opening therein adapted to pass between said light source and said photocell for developing a control signal corresponding to the zero reference position upon excitation of said photocell each time said opening passes between the light source and the photocell.

3. An electromechanical oscillator comprising a DC motor having a field winding and an armature winding adapted to be excited from a DC source and an AC source, respectively, a pair of oppositely poled, parallel connected SCR's connected in series with said armature, means for selectively gating said SCR's to excite said armature winding through one or the other of said SCR's, said selective gating means including a first and a second channel, each adapted to develop a gating signal for a corresponding SCR in response to applied control signals, means for applying said control signals to said first and said second channels so as to alternately energize said channels and thereby alternately gate said SCR's to periodically reverse the sense of armature excitation for said motor, and further including a photoelectric circuit for establishing a zero reference position about which the motor oscillates, said circuit having a light source, a photocell and a reference element driven by said motor for periodically interrupting said light source, said photocell being responsive to the periodic interruption of the light source to provide an output signal corresponding thereto, a bistable multivibrator for providing said control signals, means for changing the state of said multivibrator in response to said output signal and means connecting said first and said second channels to receive the control signals from the multivibrator.

4. An electromechanical oscillator as set forth in claim 3 wherein said multivibrator includes a first and a second output, means connecting said first output to said first channel and said second output to said second channel and further including means for causing a fixed state in the multivibrator to produce a constant-sense excitation for said armature through one or the other of said channels.

5. An electromechanical oscillator as set forth in claim 4 wherein said means for causing a fixed state includes a fixed biasing source, switch means for connecting said biasing source to said multivibrator and timing means for actuating said switch means to automatically change the excitation state of said motor from an alternating sense to a constant-sense excitation.